United States Patent [19]
Leiber

[11] 3,921,666
[45] Nov. 25, 1975

[54] VALVE WITH A PLURALITY OF CONNECTIONS

[75] Inventor: Heinz Leiber, Leimen, Germany

[73] Assignee: Teldix GmbH, Heidelberg, Germany

[22] Filed: Nov. 23, 1973

[21] Appl. No.: 418,194

[30] Foreign Application Priority Data
Nov. 22, 1972   Germany............................ 2257213
Mar. 8, 1973   Germany............................ 2311408

[52] U.S. Cl. ....... 137/557; 137/596.16; 137/596.17; 137/596.2; 137/627.5
[51] Int. Cl.² ................. F15B 13/044; F15B 13/043
[58] Field of Search ....... 137/596.1, 596.16, 596.17, 137/596.18, 596.2, 627.5, 557

[56] References Cited
UNITED STATES PATENTS

| | | | |
|---|---|---|---|
| 2,152,084 | 3/1939 | Paine | 137/625.27 X |
| 2,372,311 | 3/1945 | Brown | 137/627.5 X |
| 2,910,089 | 10/1959 | Yarber | 137/625.65 |
| 2,935,092 | 5/1960 | Stoner | 137/627.5 |
| 2,967,525 | 1/1961 | Stoffregen et al. | 137/627.5 X |
| 3,043,336 | 7/1962 | Parent et al. | 137/596.17 X |
| 3,120,103 | 2/1964 | Beard et al. | 137/627.5 X |
| 3,151,624 | 10/1964 | Koutnik | 137/627.5 X |
| 3,461,913 | 8/1969 | Scott | 137/627.5 |
| 3,692,058 | 9/1972 | Buhne | 137/627.5 |

*Primary Examiner*—Alan Cohan
*Assistant Examiner*—Gerald A. Michalsky
*Attorney, Agent, or Firm*—Spencer & Kaye

[57] ABSTRACT

A valve with a plurality of connections comprises a valve body, three or more connections thereto, an operative valve member movable into first and second positions and an intermediate position in which a first and a second connection are respectively closed, closure members for closing these connections and attached to the operative valve member through lost motion means and passage means in the valve body for connecting the first connection, when open to another connection and for connecting the second connection, when open, to the same or a further connection.

19 Claims, 13 Drawing Figures

VALVE WITH A PLURALITY OF CONNECTIONS

Background of the Invention

The invention relates to a valve, such as a magnetic valve, with three or more, e.g. four, connections for example for hydraulic fluid. In one such valve, the armature may be held in a starting position under the action of a first spring, in which position two connections are connected to each other and a further connection is closed by a first closure member connected to the armature. The armature may be moved by a control force, against the action of the spring, into a second position in which a second connection is closed by means of a second closure body connected to the armature and the previously closed connection is in communication with another connection (three with one or four).

Such valves are known which have three connections in the form of two-way valves. They are used in the field of anti-lock controllers for braking systems in addition to other applications. They are connected, for example, into the brake line of a vehicle braking system in such a manner that, in the unenergised state the brake line is connected through (connections one and two are connected together). With a tendency to lock on the part of a wheel or wheels, the valve is then switched over and, to reduce pressure at the wheel brake, connects the wheel brake cylinder to a return line (connections one and three are connected), cf. e.g. German Accepted Patent Specification No. 1,914,765, FIG. 3. If four connections are provided, the valve can be used as two check valves separated from each other and opened alternately.

In the case of many anti-lock control systems, however, in addition to the required states "increase pressure" and "reduce pressure", a state in which the pressure is kept constant is also required. To realise this state, in which the brake line is interrupted, but the wheel brake cylinder is not connected to the return line, hitherto two straight valves were used, that is to say a normally open inlet valve was connected into the brake line and a normally closed outlet valve was connected between the wheel brake cylinder and the return line (cf. e.g. German Accepted Patent Specification No. 1,914,765, FIG. 1).

To make the third pressure state (keeping the pressure constant) possible, it is also already known from the German Accepted Patent Specification No. 1,914,765 to control the two-way valve with pulses, wherein with the suitable selection of the pulse duty ratio of the pulse sequence, a constant brake pressure is achieved in the average.

From U.S. Pat. No. 2,910,089 an electromagnetically actuated control valve designed as a slide valve is known, which valve can take up at least three different positions. In the case of this valve, a control slide is displaced in the axial direction by the armature. The control slide is constructed at its periphery in such a manner that it connects together or blocks radial openings present in different positions in the housing of the control slide. At least one intermediate position of this control valve is located by a stop, which is held in a specified position during the actuation of the valve to achieve an intermediate position under the action of a special magnetic winding. When this is actuated it prevents movement of the armature, because of the valve energisation, beyond the intermediate position.

Summary of the Invention

It is an object of the invention to create a valve which provides for three different valve positions and is very much simpler than the above mentioned known solutions. The valve should in this case not be designed as a slide valve for sealing reasons and a single control element should be sufficient therefor.

According to the invention, there is provided a valve with a plurality of connections comprising a valve body, first and second connections in said valve body, at least one further connection in said valve body, an operative valve member in said valve body and movable into a first position in which said first connection is closed, a second position in which said second connection is closed and an intermediate position in which both said first and second connections are closed, a first closure member for closing said first connection in said first and intermediate positions of said operative valve member, a second closure member for closing said second connection in said intermediate and second positions of said operative valve member, first lost motion means connecting said first closure member to said operative valve member and whose lost motion is fully taken up in a position between said intermediate position and said second position of said operative valve member, when moving in the second position second lost motion means connecting said second closure member to said operative valve member and whose lost motion is fully taken up in a position between said intermediate position and said first position of said operative valve member, when moving in the first position first passage means connecting said first connection with a said further connection when said first connection is open and second passage means for connecting said second connection with said further connection when said second connection is open.

Brief Description of the Drawings

The invention will now be described in greater detail, by way of example, with reference to the drawings, in which.

Description of the Preferred Embodiments

Figure 1:
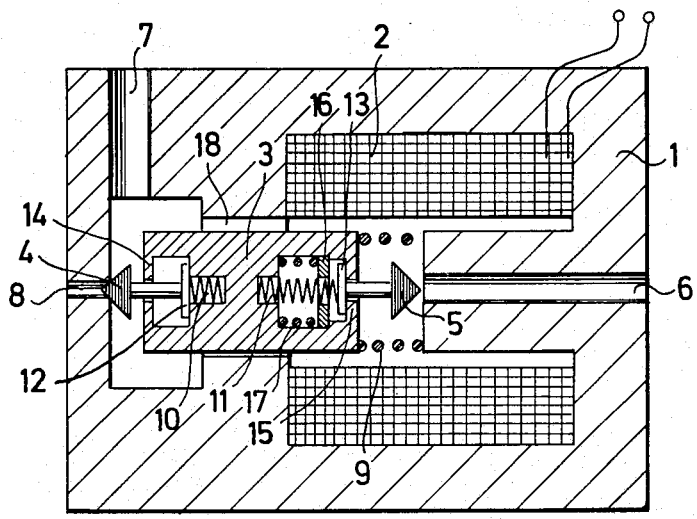
FIG. 1 shows a diagrammatic sketch of one form of embodiment in accordance with the invention.

In accordance with the invention a known two-way valve is modified to provide a valve with an intermediate position in which both closable connections are closed. The additional expenditure required for this is insignificant. In the case of a valve with four connections, the invention additionally creates a state in which the two separate valve parts are closed.

Means for setting the intermediate position may comprise a further spring force opposed to the operative valve member or armature movement and operative on reaching the intermediate position and a control force which can be related to an intermediate value, in such a manner that the armature is moved into the intermediate position when this control force is present from which time the further spring counteracts the armature movement.

In accordance with one form of embodiment of the invention, a further spring, which is preferably prebiassed, is mounted in the valve body to control the intermediate position of the armature and when the armature moves, a stop of the armature comes into engagement with this spring. With the actuation of the valve by the low power, the armature can not be moved any further against the force of this spring. The spring may also be located on the armature with the stop provided on the valve body. The spring may be a leaf spring or a helical spring seated on the valve body, which spring, after a certain armature movement, counteracts, this movement.

One embodiment in which the armature, itself, contains the additional spring which determines the intermediate position is particularly favorable. Here a further stop or entrainment means is provided, which is displaceable in the direction of the armature axis over a predetermined distance relative to the armature and which is biassed in the direction of the closure body by means of the further spring. In the starting position of the valve the stop lies at a small distance from the second closure member and, in the course of armature movement on valve energisation, comes into engagement with the closure member displaced relative to the armature. Then with further armature movement, it can be displaced by the above-mentioned distance against the spring force acting thereon.

The two spring forces acting on the closure member may be produced by a common spring.

The valve can be brought into the two energised positions by different exciting currents. In accordance with a preferred embodiment, the energisation for movement to the intermediate position is achieved by pulses of corresponding pulse duty ratio which must be so selected that, on the one hand, no valve return is effected in the pulse pauses and, on the other hand, the valve does not reach the second or end position. As will be shown further later on, the pulses for this can be produced in different ways. Furthermore, monitoring circuits for the correct setting of the valve will be described later.

Also valves, which are controlled by means of pressure media are embraced by the invention. To this end a pressure chamber is associated with the valve, which pressure chamber contains a displaceable part, e.g. a piston, for the control of pressure means. The piston is connected to the operative valve member or armature.

In accordance with one embodiment, the valve includes an electric switch, which is actuated when the armature or operative valve member reaches the intermediate position, and then, if this intermediate position is to be maintained interrupts the further pressure increase in the pressure chamber and thus prevents further displacement of the armature or operative valve member. Control can be effected by means of a two-way magnetic valve or a three-position valve. Also a proximity switch can be used as the switch.

Referring now to the drawings, in the embodiment of FIG. 1, the valve comprises a valve housing 1, an energising winding 2, an armature 3, two closure member bodies 4 and 5 and hydraulic connections 6, 7 and 8. When used in an anti-lock control system for the wheel brakes of a vehicle, the hydraulic connection 6 is connected to the brake master cylinder, the connection 7 is connected to the wheel brake cylinder and the connection 8 is connected to the brake fluid return line. A spring 9 biasses the armature towards the starting position shown. The two closure members 4 and 5 are movable relative to the armature along the armature axis. Springs 10 and 11 urge extensions 12 and 13 of the closure bodies against stops 14 and 15 as far as possible. A stop 16 can be moved to the left against the force of a spring 17. It is in its right hand position in the armature 3 in the position shown.

In the starting position of the armature 3 as shown, the connection 6 is connected to the connection 7 by way of a passage 18. The closure member 4 which is acted upon by the pressure of the spring 10, closes the connection 8. If the winding 2 is energised by a current sufficient for the valve to achieve an intermediate position, then the armature 3 is moved to the right. In this case the closure member 5 is moved until it abuts the valve seat of the connection 6 and the spring 11 is compressed until the extension 13 of the closure member 5 engages the stop 16. The magnetic field generated by the control current in the winding 2 is not sufficient to move the armature further against the force of the spring 17, i.e. the valve has reached its intermediate position. Since, as a result of the armature movement, the closure member 4 has moved relatively to the armature 3 under the action of the spring 10, the connection 8 is still closed as before.

If the current through the coil 2 is increased, then the armature 3 is moved further to the right. A relative movement takes place between the armature 3 and the closure member 5 together with the stop 16. The closure member 4 is now entrained by the stop 14 of the armature 3 and opens the connection 8 and the connection 8 is thus connected to the connection 7.

Figure 2B:
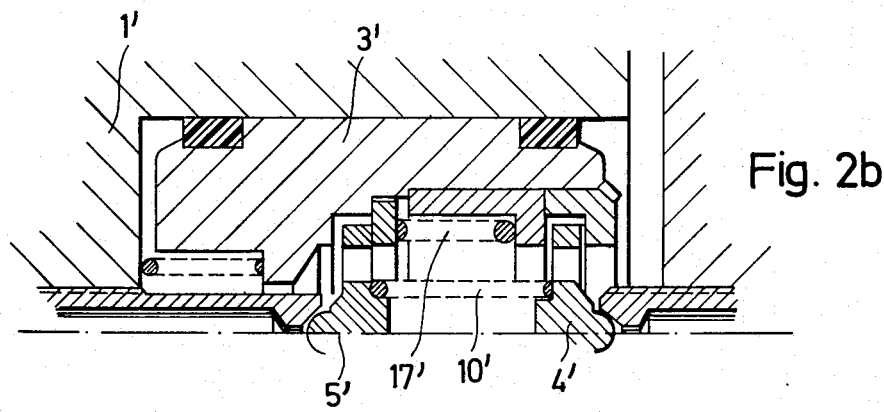
FIGS. 2b and 2c are partial views of the valve of FIG. 2a showing the working parts in different positions.
Figure 2C:
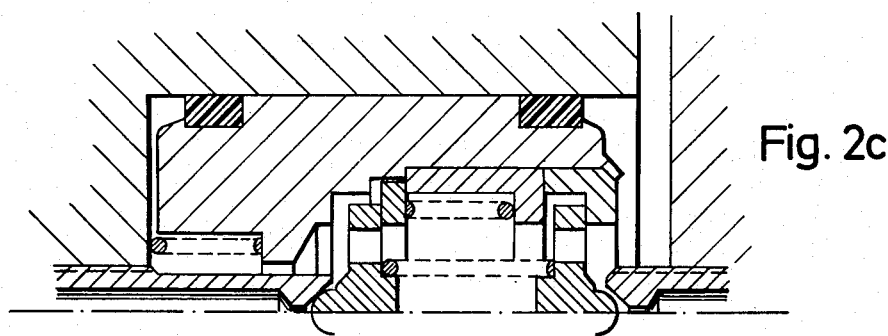
Figure 2A:
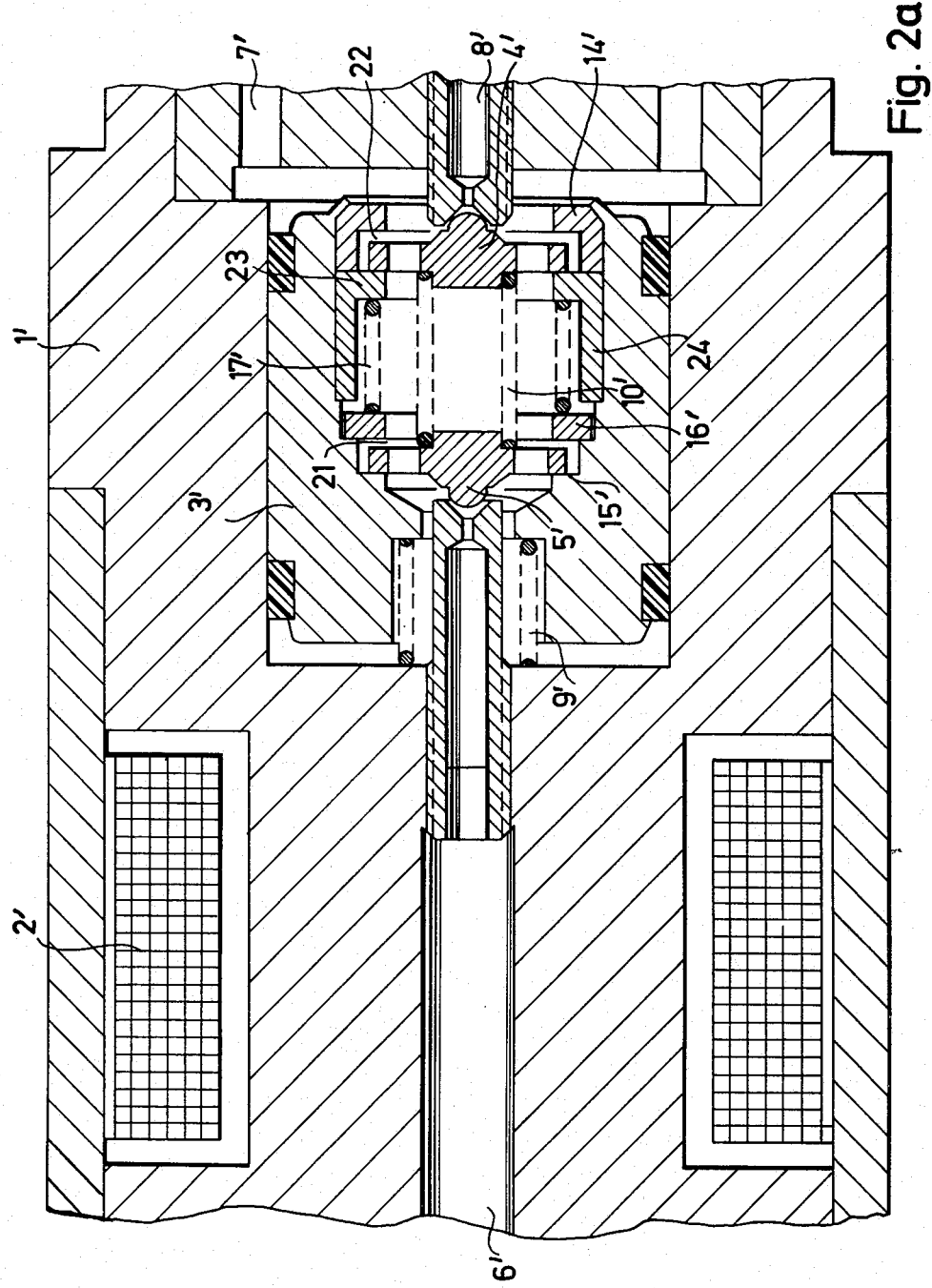
FIG. 2a shows a possible construction of the magnetic valve in accordance with the invention.

FIG. 2a shows a section through a preferred practical form of the invention. Here the valve housing has the reference numeral 1', the energising winding 2' and the armature 3'. The connections corresponding to the hydraulic connections 6–8 are given the reference numerals 6'–8'. The closure members are given the reference numerals 4' and 5'. The spring pressure on these closure members is generated by a common spring 10'. The spring 9' biases the armature in to the position shown.

The closure members 4' and 5' can move relative to the armature 3' in the axial direction thereof as a result of clearances shown at positions 21 and 22 in FIG. 2a. The positions of the closure members shown are set, as regards the closure member 4', by the valve seat of the connection 8' and the stop 23, and as regards the closure member 5', by the stop 15' and the spring 10'.

Now, if the valve is energised with a low current, then the armature moves to the left and the closure member 5' comes to abut the valve seat of the connection 6'. The movement stops, if the stop 16', which is movable relative to the armature 3', comes to abut the closure member 5', since the force generated by the magnetic field is not sufficient to overcome also the force of the spring 17'; spring 17' retains the stop 16' in the position shown. FIG. 2b shows the relative positions of the individual parts in the intermediate position.

If the energisation is further increased, the armature is moved further to the left, the stop 16' moving relative to the armature 3' against the spring force of the spring 17' until it abuts the stop 24. During this movement from the intermediate position into the left hand end position, the stop 14' has entrained the closure member 4', moved it away from the connection 8' and thus has opened the connection 8'. FIG. 2c shows this left hand end position.

In addition to this above-mentioned method of causing the valve to move into its intermediate position by means of a correspondingly dimensioned current, the possibility of achieving the same effect with pulses has also been mentioned. This pulse method has, as compared, for example, with the energisation of different windings, the advantage that a second power amplifier, otherwise necessary, can be dispensed with. The use of a circuit which itself determines the pulse duty ratio of the pulses is more advantageous than the provision of a specific pulse duty ratio. Three embodiments for achieving this are shown in the drawings.

Figure 3:
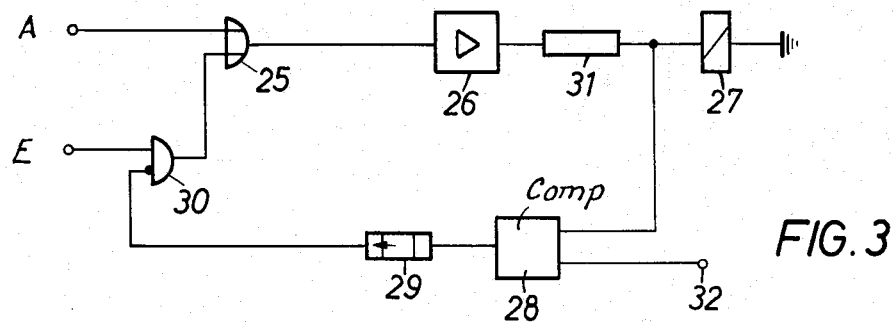
FIG. 3 shows a first form of actuating circuit for the valve.

In the case of the embodiment of FIG. 3 the signal for causing movement of the valve into the intermediate position is provided at E and for causing movement of the valve into the left hand end position is provided at A. Both voltages are assumed to be of the same magnitude. These signals are fed to the valve winding 27 by way of an OR-gate 25 and a common power amplifier 26. With the presence of the signal at A, and after the time necessary for response, the armature is moved through the intermediate position to the end position. This signal at A is not effected by the comparator 28 and the timing element 29. If, on the other hand, the signal for setting the intermediate position occurs at E, then this signal is eventually blocked, by means of the AND-gate 30 which has an inverted input connected to the output of timing element 29 for a time controlled by the timing element 29. This takes place as soon as the voltage corresponding to the valve current, which is tapped off at the resistance 31 and fed to the comparator 28, exceeds a predetermined comparison voltage value. This comparison voltage value is applied to the terminal 32 of the comparator 28. This comparison voltage value is so selected that the intermediate position is safely reached, but reaching of the end position is prevented. The time specified by the timing element 29 must be so selected that the blocking of the trigger signal does not take place too long and allow the armature to return to its starting position.

Figure 4:
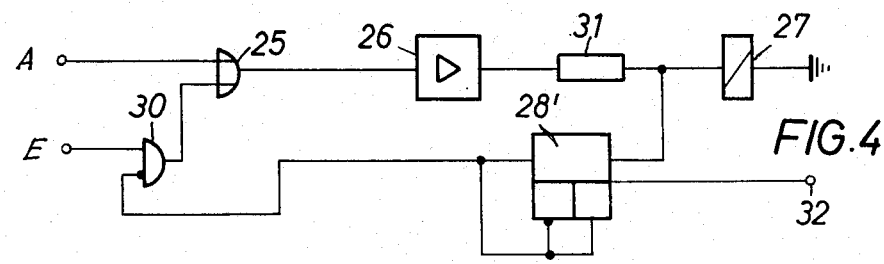
FIG. 4 shows a second form of actuating circuit for the valve.

The embodiment of FIG. 4 differs from that of FIG. 3 merely in that the comparator 28' can further be switched over to a lower comparison value and in that this switchover is carried out with the appearance of an output signal from the comparator. This means that the AND-gate 30 is blocked (pulse pause), as soon as the upper comparison voltage value is exceeded by the voltage at the valve and that this blocking remains maintained until the lower comparison voltage value is achieved.

Figure 5:
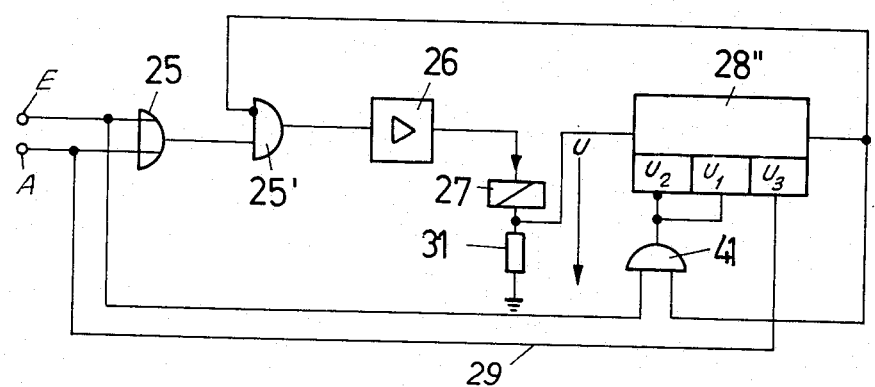
FIG. 5 shows a third form of actuating circuit for the valve.

FIG. 5 shows a further embodiment of a trigger circuit in accordance with the invention. Here the signal for moving the valve 27 into its intermediate position is applied at the terminal E and the trigger signal for moving the valve 27 to the end position is applied at the terminal A. Each of these signals passes by way of the OR gate 25 and the normally open AND-gate 25' to the amplifier 26, which would then supply, if not otherwise influenced, a current which is more than sufficient for the displacement of the valve armature into the end position. A comparator 28'' with comparison values which can be switched-over, is connected to the valve 27 in parallel therewith and to a resistance 31. (or even only to the resistance). Thus a voltage U, which is proportional to the valve current, is fed to the comparator 28''. Because of appropriate switching of the comparator 28'', comparison voltage $U_2$ is operative with the occurrence of a control command at the terminal E. This command should bring the armature into its intermediate position. The comparison voltage $U_2$ is less than the voltage which occurs when the current necessary for reaching the end position is present at the comparator input. However it is above the voltage which arises as a result of a current which is just sufficient to move the armature into the intermediate position. Thus the valve responds rapidly. If the voltage U exceeds the threshold $U_2$ then the comparator 28'' emits a signal which, on the one hand, blocks the AND-gate 25' and thus permits the valve current to drop and on the other hand opens the AND-gate 41. Thus, instead of the comparison value $U_2$, a somewhat smaller auxiliary value $U_1$ is rendered operative. When the current falls below this threshold $U_1$, the output signal of the comparator 28'' ends and thus a new rise of the valve current occurs and the threshold $U_2$ becomes operative again. The comparison values $U_1$, $U_2$ can be replaced, if desired by a common threshold value.

Figure 6:
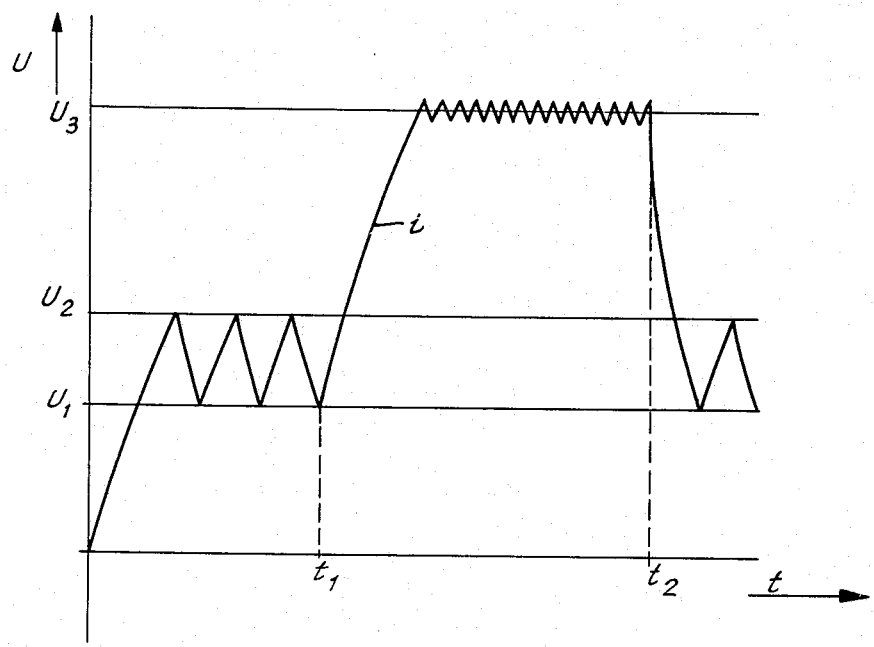
FIG. 6 is a diagram for explaining the operation of the triggering.

In FIG. 6 of the drawing, in which the curve of the voltage U is plotted against the time $t$, this above-described course is shown by until the point in time $t_1$. The thresholds $U_1$ and $U_2$ are so selected that the mean value of the current is sufficient to hold the valve in position.

From $t_1$, a signal should appear at the terminal A, which signal renders the higher threshold $U_3$ of the comparator operative over the line 29. This threshold is high enough to bring the valve into its end position. The current $i$ and thus the voltage U oscillate about the threshold (for U about the threshold $U_3$) as a result of blocking of the gate 25' by the comparator. The periods of the oscillations are determined by the inertia of the circuit. At the point in time $t_2$ again a signal for movement of the magnetic valve to the intermediate position is applied to the terminal E and thus the threshold $U_2$ becomes operative. The valve thus moves into the intermediate position. The transition from the valve position which is fixed by the threshold $U_3$ to the intermediate position can be carried out in a manner differing from this description. Namely, in order to achieve a safe transition into the intermediate position, it may be necessary to cut off current from the valve for a short time and only then to act on a signal to achieve the intermediate position.

If the voltage is tapped off only at the resistance, the resistance being preferably in front of the amplifier and the valve, then in the case of a winding short-circuit and a short-circuit of the amplifier, a current limitation with respect to earth is carried out. Instead of measuring the valve current by measuring the voltage, the current value can also be determined by measuring the effect of the magnetic field produced, e.g. by the action of the Hall effect or by means of field plates. The values obtained can then be used for the comaprison. It is of little importance, as far as the invention is concerned, in which sequence the amplifier, the resistance and the valve are arranged and from which elements the voltage U is tapped.

Figure 7:
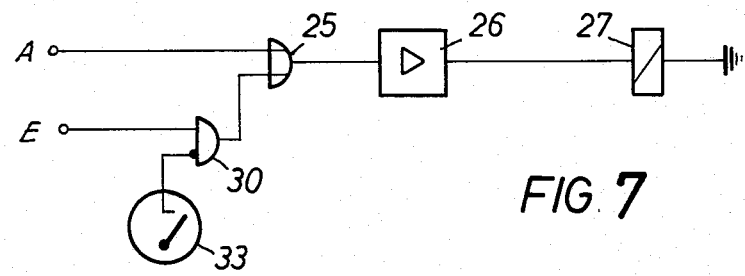
FIG. 7 shows another form of actuating circuit for the valve.

In the case of the embodiment of FIG. 7, blocking of the signal appearing at E by means of the AND-gate 30 is effected by a switch 33. This switch is positioned in the valve and responds as soon as the armature reaches the intermediate position. If the armature is required to move again into the starting position, then the switch is immediately opened again and again applies a voltage across the valve 27.

Figure 8:
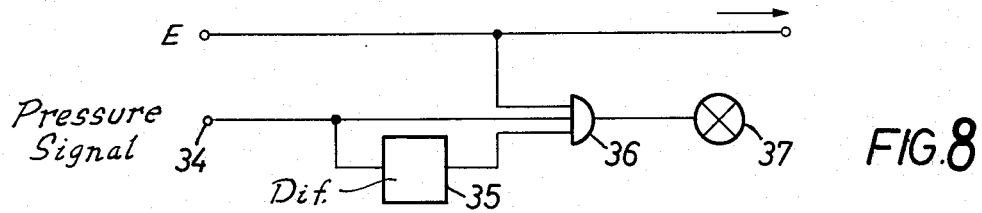
FIG. 8 shows a first form of monitoring circuit for such trigger circuits.

The switch arrangement of FIG. 8 serves to monitor the valve intermediate position. In this intermediate position the controlled pressure must not vary. Therefore, in addition to a voltage from a pressure sensor which is connected at the terminal 34, the output signal of a differentiator 35 which differentiates this voltage and the signal for causing movement of the valve into the intermediate position are applied to the AND-gate 36, which, in these circumstances, causes a warning lamp 37 to light up, if, when there is a movement requiring a control signal and a pressure to be present, a pressure change is also undergone.

Figure 9:
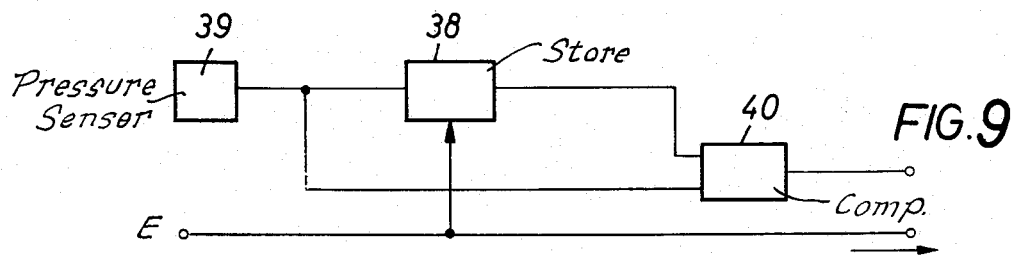
FIG. 9 shows a second form of monitoring circuit for such trigger circuits.

FIG. 9 shows a further circuit for monitoring the correct positioning of the valve in the intermediate position. The signal fed to the valve for causing the valve to take up the intermediate position is here also fed to an electrical store 38, to which is also applied the voltage of a pressure sensor 39. This pressure voltage is thus stored on the occurrence of the valve control signal. The pressure sensor 39 is arranged to sense the pressure controlled by the valve and produces a voltage corresponding to this pressure. After the occurrence of the valve control signal E, no further pressure variation, per se, must take place because of the valve position. If this is not the case, the valve has not responded correctly. This situation is determined in the comparison element 40 where the stored voltage corresponding to the pressure existing on the occurrence of the E signal is compared with the voltage corresponding to the instantaneous pressure. If the pressure varies by a specified amount, the comparison element 40 emits a voltage which is used to move the valve to the end position (as an additional A-signal), so that in the version with three connections, a pressure drop takes place. As a result of the comparison element 40, continuous switching back and forth between the end positions of the valve takes place.

Figure 10:
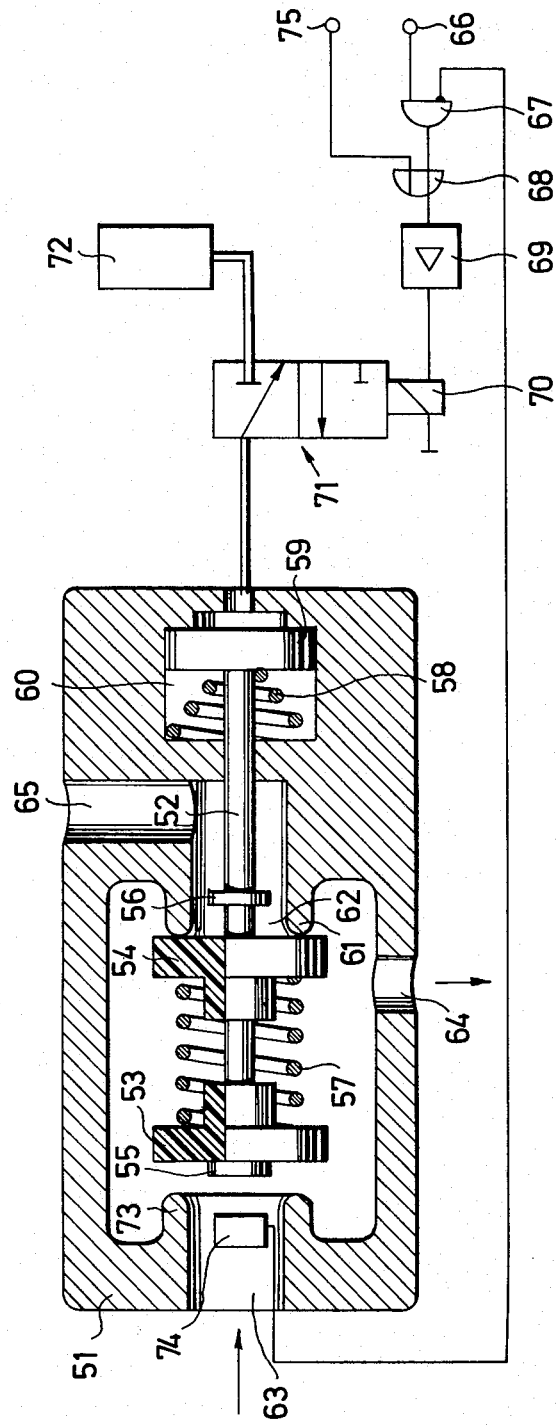
FIG. 10 shows a diagrammatic sketch of a form of embodiment of the invention with hydraulic actuation.

FIG. 10 of the drawings show a further embodiment of the invention. The valve body is given the reference numeral 51 and the armature plunger 52. On it are displaceably supported the two closure bodies 53 and 54. The range of possible displacement of the closure members is determined by two stop elements 55 and 56 rigidly connected to the armature plunger 52. The spring 57 which acts between the closure members 53 and 54 keeps the closure members 53 and 54 spaced apart.

The starting position of the armature plunger 52, as shown, is produced by a spring 58 which acts on a piston 59 in a control cylinder 60 and displaces it to the right. In this starting position, the closure member 54 is seated on the valve seat 61; the closure member 54 is in this case displaced, with respect to the armature plunger to the left along the path 62. In this position the opening 63 is connected to the opening 64. On the other hand the connection of the valve opening 65 to valve opening 64 is interrupted by the closure body 54.

Now if the valve is to be moved into its intermediate position, a control signal is fed to terminal 66. This signal is fed by way of AND-gate 67, OR-gate 68, and amplifier 69 to the winding 70 of a servo valve 71, which allows pressure medium inflow (e.g. compressed air) from a pressure source 72 to the control cylinder 60. The piston 59, and thus also the armature plunger 52, is in this case, displaced. Also the closure member 53 is moved to the left (by the spring force) until it is seated on valve seat 73. Shortly thereafter the switch 74 is actuated, which blocks the gate 67 and thus de-energises the servo valve 71. Thus the pressure medium can escape through the valve 71 and the piston 59 begins to move to the right. However, before the closure body 53 moves off its seat, the switch changes its signal and the servo valve 71 is energised again and so on. In this intermediate position of the valve the closure body 54 has still not moved off the seat 61, i.e. no connection exists between the three openings 63, 64 and 65.

Should the valve be brought into the other end position, then a signal appears at the terminal 75. Here no interruption occurs on the attainment of the intermediate position, rather the armature plunger is moved past its intermediate position. In this case the closure body member 54 is moved off its seat 61. The end position is determined by the force of the spring 58 or a special stop (not shown). At the end of the actuating signal, the valve returns back into its starting position.

Instead of the one two-way valve, the use of a release valve is also possible. This release valve drains the pressure means and thus brings the armature plunger back to its starting position if no control signal is present. Here a normally closed inlet valve (straight valve) is additionally necessary. Also a three-position magnetic valve can be used to actuate the valve in accordance with the invention and this has the advantage of using less air. Here the actuation of the switch causes the control pressure to be maintained constant.

For example a capacitive or inductive proximity switch can serve as the switch. Also a dry reed contact or a magnetic field sensitive semiconductor which is actuated by a magnet secured to the armature may be used.

The valve just described can, for example, serve for the control of the brake pressure of a lorry, wherein the signals of a blocking controller actuate the servo valve (s). Compressed air and hydraulic fluid can be used to control the valve and the valve itself can control compressed air and hydraulic liquid.

Figure 11:
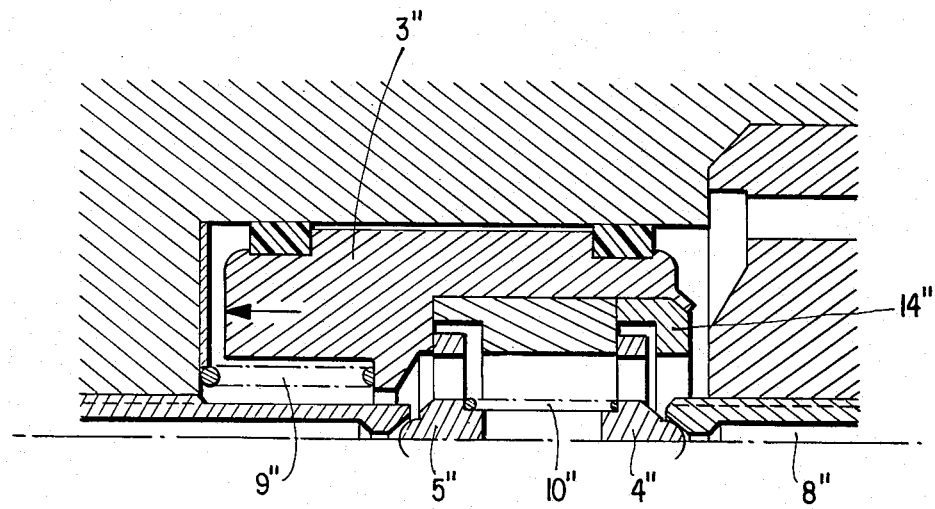
FIG. 11 shows a further embodiment of the invention.

In FIG. 11 a further embodiment of the invention is represented. In this Figure the armature is shown in a similar manner as in FIG. 2b; in FIG. 11 the armature is shown in its first position.

In this embodiment, however, only two springs are provided contrary to FIG. 2. The first spring 9″ urges the armature 3″ into the position shown. The force of the second spring 10″ urging the two closure members 4″ and 5″ to positions being spaced apart, is — in its action on armature 3″ — in the position shown directed against the force of the spring 9″. In this position the closure member 4" is seated on positions of the connection 8" and the spring 10" therefore produces a force on the armature directed to the left. When the armature is moved to the left, this direction of the force of spring 10" is maintained until the armature reaches a position in which both closure members are in their closing positions. At this moment the force of the spring 10" acting on armature 3" is 0. When the entrainment means 14" thereafter comes into contact with the closure member 4" as the movement to the left is continued, the force of spring 10" acting on the armature suddenly is directed to the right, and thus in the same direction as the force of spring 9". When the control force adjusted to move the armature 3" to the intermediate position is effective, this force is not sufficient to move the armature against the combined spring forces. This position, therefore, is the intermediate position. Contrary to FIG. 2 in FIG. 11, there is no movable stop 16'.

It will be understood that the above description of the present invention is susceptible to various modifications, changes and adaptations.

What is claimed is:

1. A solenoid operated valve with a plurality of connections comprising: a valve body; first and second connections in said valve body; at least one further connection in said valve body; an armature in said valve body and movable into a first position in which said first connection is closed, a second position in which said second connection is closed and an intermediate position in which both said first and second connections are closed; a first closure member for closing said first connection in said first and intermediate positions of said armature; a second closure member for closing said second connection in said intermediate and second positions of said armature; first lost motion means for connecting said first closure member to said armature and whose lost motion is fully taken up in a position between said intermediate position and said second position of said armature when moving to said second position; second lost motion means connecting said second closure member to said armature and whose lost motion is fully taken up in a position between said intermediate position and said first position of said armature when moving to said first position; first passage means connecting said first connection with a said further connection when said first connection is open; second passage means for connecting said second connection with said further connection when said second connection is open; a spring normally urging said armature into its said first position; spring means for urging said first and second closure members into positions spaced apart; means for providing a spring force which is directed against movement of said armature upon reaching said intermediate position when said armature is moving toward said second position; a single solenoid mounted on said valve body in a position to cause said armature to move from said first position toward said intermediate and second position when said solenoid is energized; and control means connected to said solenoid for selectively supplying a first control current to said solenoid which is sufficient to overcome the force of said spring and said spring force to move said armature to said second position, and a second control current to said solenoid which is sufficient to overcome only the force of said spring to move said armature to said intermediate position.

2. A valve as defined in claim 1, wherein said first and second lost motion means each comprise entrainment means on said armature for entraining the associated said closure member in a predetermined position of said armature.

3. A valve as defined in claim 2, wherein said means for providing a spring force comprises a further spring means mounted on said armature.

4. A valve as defined in claim 3, wherein said further spring means comprises a biassed spring mounted in said valve body.

5. A valve as defined in claim 4, and comprising a stop on said armature for engagement with said biassed spring.

6. A valve as defined in claim 3, wherein said further spring means comprises a biassed spring mounted on said armature.

7. A valve as defined in claim 6, and comprising a stop in said valve body for engagement with said biassed spring.

8. A valve as defined in claim 3, wherein said valve further comprises a stop member displaceable along an axis of said armature over a predetermined distance, positioned in said first position of said armature a predetermined short distance from said second closure member and engageable on movement of said armature with said second closure member for movement therewith against the spring force of said further spring means.

9. A valve as defined in claim 2 wherein said spring means comprises a common spring for both said first and second closure member urging said first and second closure member into positions spaced apart; and wherein said means for providing a spring force includes means on said armature and cooperating with said common spring such that the force of said common spring effective on said armature is directed against the force of said spring urging said armature in its said first position when said armature is between said first position and a small distance from said intermediate position and that the force of said common spring is directed in the same direction as the force of said spring urging said armature in said first position, when reaching said intermediate position, in which said entrainment means on said armature comes in contact with said first closure member.

10. A valve as defined in claim 1, wherein said spring means comprises a common spring for both said first and second closure members.

11. A valve as defined in claim 1, wherein said control means includes supply means for supplying pulses with an appropriately dimensioned pulse duty ratio to said solenoid as said second control current for moving said armature into said intermediate position.

12. A valve as defined in claim 11, wherein: said control means includes first and second input terminals for the receipt of first and second control signals respectively; and said supply means includes a comparison circuit for comparing a value proportional to the current supplied to said solenoid with a constant comparison value and for producing a signal when said comparison value is exceeded and means for causing said signal to interrupt for a given time the control-signal for retaining said armature in said intermediate position.

13. A valve as defined in claim 12, and comprising means for switching said comparison value to a lower auxiliary comparison value operative after an output from said comparison circuit to end said interruption when said lower auxiliary comparison value is passed downwardly.

14. A valve as defined in claim 11, wherein said supply means includes a switch in said valve actuable when said armature reaches its said intermediate position to block feed of current to said valve.

15. A valve as defined in claim 1, and comprising a pressure sensor in a pressure space serving said valve for producing a voltage corresponding to the pressure sensed, a differentiator for differentiating said corresponding voltage, a warning device, and means for actuating said warning device with the presence of a control signal for said intermediate position of said armature and an output from said differentiator differing from 0.

16. A valve as defined in claim 1, and comprising a pressure sensor in a pressure space serving said valve, an electronic store connected to said pressure sensor for storing a voltage corresponding to the pressure sensed on appearance of a control signal for said intermediate position of said armature, a comparator for comparing said stored voltage and the instantaneous voltage from said pressure sensor and means for bringing said armature into its said second position on deviation of said instantaneous voltage over said stored voltage to a predetermined extent.

17. A valve with a plurality of connections comprising: a valve body; first and second connections in said valve body; at least one further connection in said valve body; an operative valve member in said valve body and movable into a first position in which said first connection is closed, a second position in which said second connection is closed and an intermediate position in which both said first and second connections are closed; a first closure member for closing said first connection in said first and intermediate positions of said operative valve member; a second closure member for closing said second connection in said intermediate and second positions of said operative valve member; first lost motion means connecting said first closure member to said operative valve member and whose lost motion is fully taken up in a position between said intermediate position and said second position of said operative valve member when moving to said second position; second lost motion means connecting said second closure member to said operative valve member and whose lost motion is fully taken up in a position between said intermediate position and said first position of said operative valve member when moving to said first position, said first and second lost motion means each including entrainment means on said operative valve member for entraining the associated said closure member in a predetermined position of said operative valve member; first passage means connecting said first connection with a said further connection when said first connection is open; second passage means for connecting said second connection with a said further connection when said second connection is open; a spring urging said operative valve member into its said first position; spring means for urging said first and second closure members into positions spaced apart; a further spring means directed against movement of said operative valve member on reaching said intermediate position; and control means for selectively producing a control force adjusted to move said operative valve member to and maintain same at said intermediate position.

18. A valve as defined in claim 17, wherein said further spring means comprises a biassed spring mounted on said operative valve member.

19. A valve as defined in claim 17, wherein said valve further comprises a stop member displaceable along an axis of said operative valve member over a predetermined distance, positioned in said first position of said operative valve body a predetermined short distance from said second closure member and engageable on movement of said operative valve member with said second closure member for movement therewith against the spring force of said further spring means.

* * * * *